United States Patent [19]

Mayer et al.

[11] 3,920,962

[45] Nov. 18, 1975

[54] PULSE SUMMING CIRCUIT

[75] Inventors: Robert Mayer, Ardmore; Frank C. Pavlik, Clifton Heights, both of Pa.

[73] Assignee: Sun Oil Company of Pennsylvania, Philadelphia, Pa.

[22] Filed: Mar. 25, 1974

[21] Appl. No.: 454,513

[52] U.S. Cl......... 235/92 ST; 235/92 FL; 235/92 R; 235/151.34; 328/104

[51] Int. Cl.[2]........................................... G06M 3/08

[58] Field of Search........ 235/92 ST, 92 DM, 92 FL, 235/92 EA, 151.12, 151.34; 328/104

[56] References Cited

UNITED STATES PATENTS

| | | | |
|---|---|---|---|
| 3,590,227 | 6/1971 | Porter et al. | 235/92 ST |
| 3,724,534 | 4/1973 | Weatherston | 235/92 ST |
| 3,803,497 | 4/1974 | Fah-Mim-Tyau | 235/92 FL |

*Primary Examiner*—Joseph M. Thesz, Jr.
*Attorney, Agent, or Firm*—George L. Church; Donald R. Johnson; William C. Roch

[57] ABSTRACT

In order to sum or totalize the pulses which are selected from a pulse generator by means of a plurality of percent switches, the percent switch outputs are sequentially scanned by means of a decoder which is strobed by pulses having a repetition rate at least 20 times the repetition rate of the pulses from the pulse generator, where the number of percent switches is less than 20. The outputs obtained from the scanning devices are multiplexed together and connected to an electronic counter.

16 Claims, 2 Drawing Figures

PULSE SUMMING CIRCUIT

This invention relates to a pulse summing circuit, and more particularly to a total percent counter or totalizer.

This invention has particular utility in connection with the automatic blending system disclosed in the copending applicaion, Ser. No. 422,801, filed Dec. 7, 1973 now U.S. Pat. No. 3,860,030, issued Jan. 14, 1975. In such system, manually-operated percent switches are utilized to set the blend, i.e., to establish the percentages of the various components (such as oils, additives, dyes) in the blend. In most cases, the total percent set into a blender should have a value of 100, and if the wrong total is set in, the individual components will be in error. It is therefore important for the operator to know the total percentages set into a blender.

At times, the total set in will be other than 100, but when this is done, it is done for a specific purpose, and the total is known. The device of the present invention will allow the operator to ascertain the total of the percentages he has set in, by observing the total on an electronic counter.

An object of this invention is provide a novel pulse summing circuit.

Another object is to provide a percent totalizer for an automatic, percentage-selectable blending system.

A further object is to provide a pulse summing circuit which operates in an efficient and effective manner.

Figure 1:
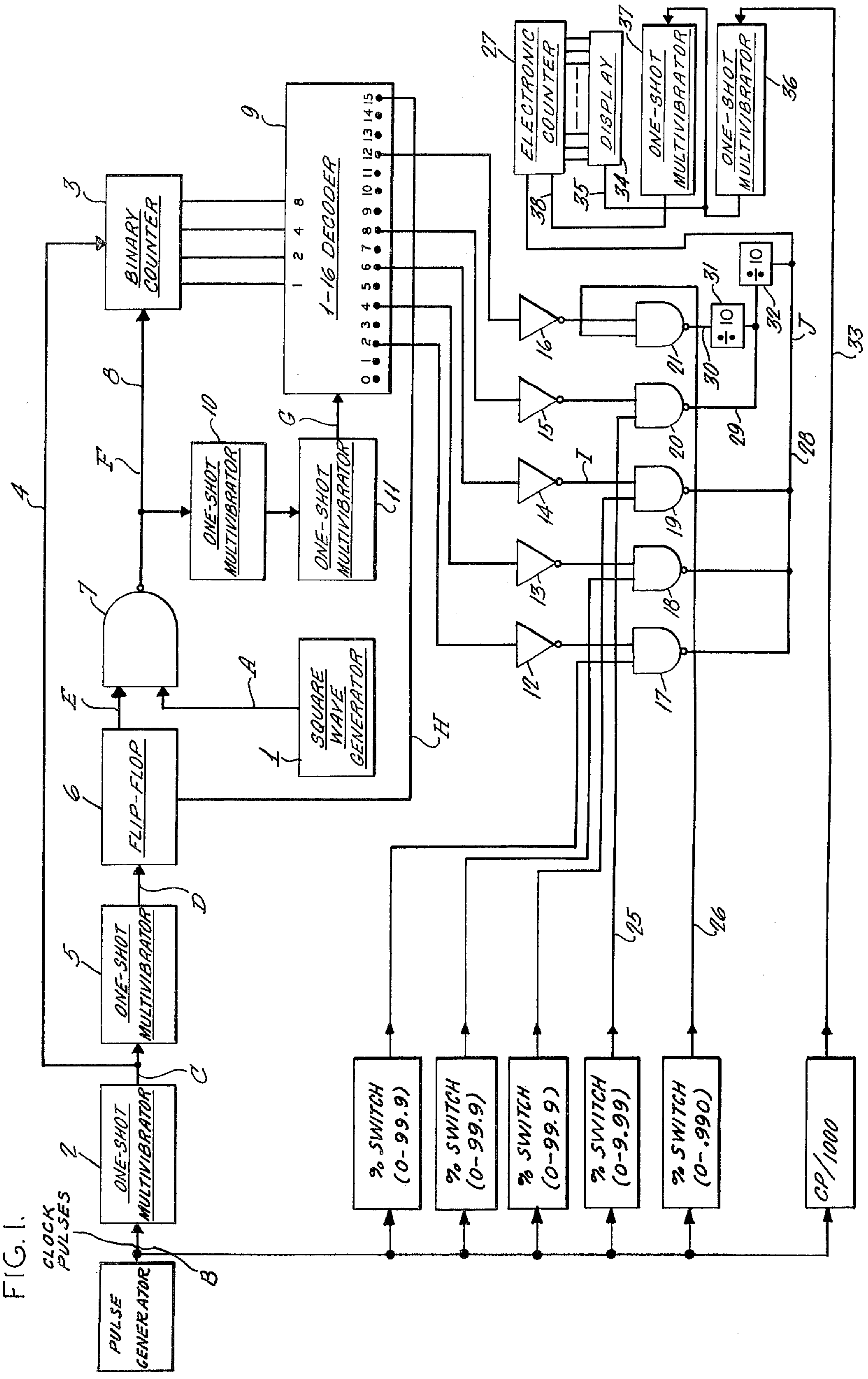
Figure 2:
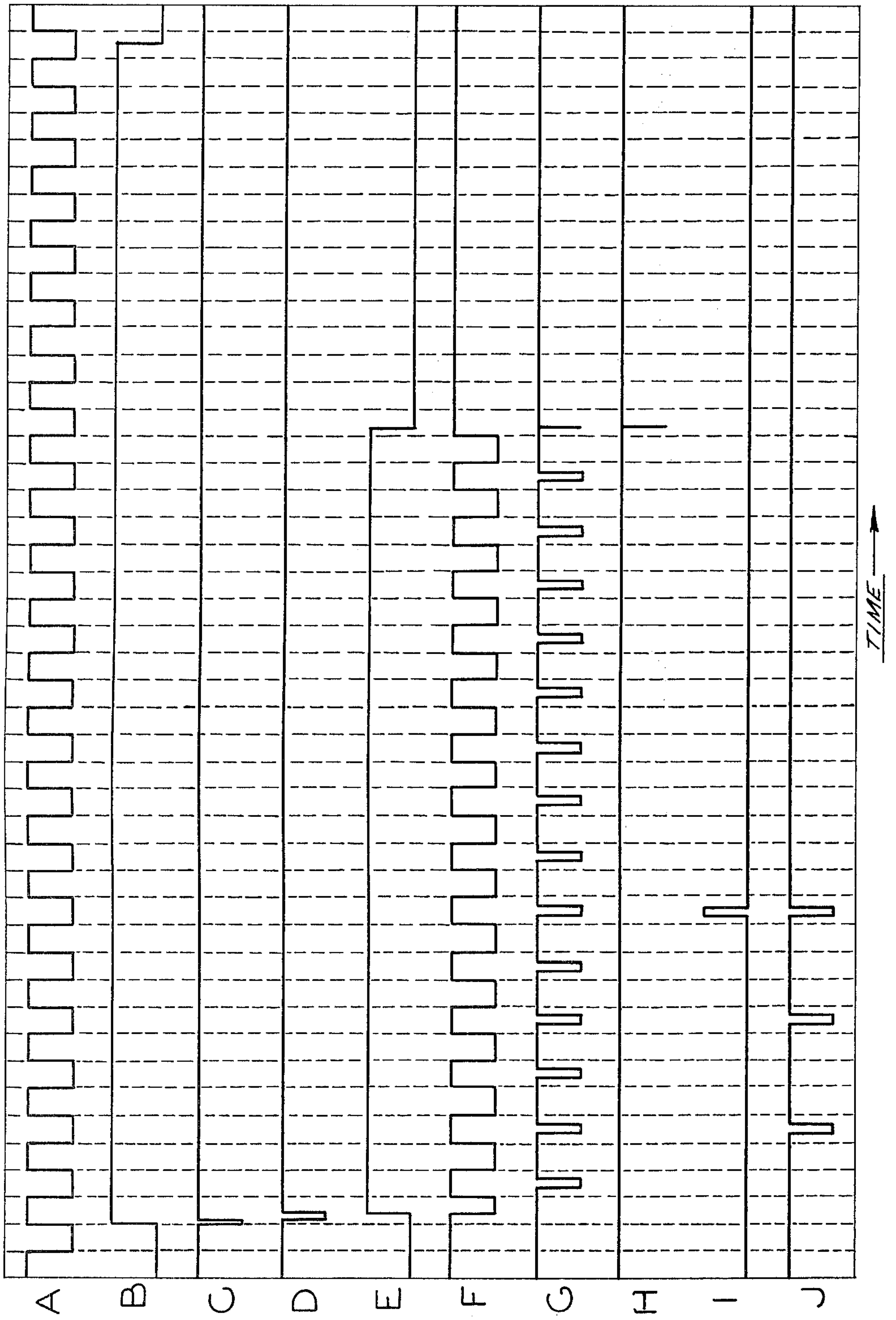

A detailed description of the invention follows, taken in conjunction with the accompanying drawings, wherein:

FIG. 1 is a block diagram of a pulse summing and indicating system according to the invention; and FIG. 2 is a representation of the waveforms at various points in the system of FIG. 1.

Speaking generally, the signals from the percent switches are in effect fed into the percent totalizer, which will be described later, and the total counts from the totalizer which occur during 1,000 clock pulses are sent to an electronic counter which will display the total in four digits including one decimal place; at the end of 1,000 clock pulses, the system is reset and the count starts over again.

As disclosed in the aforementioned application, since all the percent switches for a given header derive their signals from the same pulse generator as three-decade binary coded decimal (BCD) information, pulses from the various percent switches can occur at the same time; therefore, a simple totalizing of such pulses would be meaningless. Hence, a percent totalizer (percent switch summing circuit) such as described herein is necessary.

Referring now to the drawings, a square wave generator (oscillator) 1 has a frequency at least 20 times that of the maximum pulse rate from the pulse generator (to which the percent switches referred to are connected); for convenience, the pulse rate of the pulse generator will be herein termed the "clock pulse rate." By way of example, the maximum clock pulse rate may be about 500 Hz. Referring to the waveforms of FIG. 2, waveform A represents the waveform at the output connection A of the square wave generator 1, while waveform B represents the waveform at the clock pulse input B of a one-shot multivibrator 2. When a clock pulse is received at B (from the pulse generator) by the one-shot 2, this latter produces a narrow pulse at its output C (see waveform C, FIG. 2) which resets a BCD counter 3 by way of the reset connection 4. Also, the pulse at C triggers a second one-shot multivibrator 5, producing a narrow pulse at its output D (see waveform D, FIG. 2) which sets a flip-flop 6.

The flip-flop 6 then develops at its output E a gating voltage (see waveform E, FIG. 2) which allows the pulses of the square wave generator 1 to go through a NAND gate 7 to the count connection 8 of the BCD counter 3; the waveform at F (connection 8) is represented at F in FIG. 2. The output of counter 3 drives a 1–16 decoder 9 which is connected to counter 3.

The train of high frequency pulses (waveform F) also goes to a dual one-shot multivibrator 10, 11. The output at G of the second one-shot multivibrator 11 is (see waveform G, FIG. 2) a train of narrow pulses which occur near the middle of successive cycles of the high frequency signal F. These latter pulses G are used to strobe the decoder 9; as just stated, this strobe action takes place in the middle section of the pulses from the square wave generator 1.

The output positions Nos. 1 through 14 of the decoder 9 are all available for utilization, and are ordinarily all utilized; however, in order to simplify the illustration, only positions Nos. 2, 4, 6, 8, and 12 are shown connected in FIG. 1. The decoder output pulses at these positions are inverted by respective inverters 12, 13, 14, 15, and 16 and sent to respective NAND gates 17, 18, 19, 20, and 21 which have as their other inputs the outputs of respective percent switches. The percent switch output connections 22, 23, and 24, which come from respective percent switches having maximum settings of 100% and supplied from the clock pulse generator, are coupled respectively to the NAND gates 17, 18, and 19. The percent switch output connection 25, which comes from a percent switch having a maximum setting of 10% and also supplied from the clock pulse generator, is coupled to the NAND gate 20; the percent switch output connection 26, which comes from a percent switch having a maximum setting of 1% and also supplied from the clock pulse generator, is coupled to the NAND gate 21.

By means of the decoder 9, the percent switches are in effect looked at in sequence. Therefore, even if the same pulse appeared at the output of each percent switch, the pulses out of the NAND circuits 17–21 would be successive in time; it is these latter pulses which are wire-ORed together to drive the electronic counter 27.

The sequential switching arrangement described is illustrated by waveform I in FIG. 2, which illustrates the waveform at point I (output side of inverter 14, connected to position No. 6 of the decoder 9).

The outputs of the NAND gates to which are coupled percent swtiches of the same type, that is 0–99.9 or 0–9.99 or 0–0.99, are wired-ORed together. That is to say, the outputs of NAND gates 17, 18, and 19 (to which are coupled the 0–99.9 switches) are wired-ORed together to lead 28; the output of NAND gate 20 (and any other NAND gate, not shown, to which 0–9.99 switches may be coupled) is wired to lead 29; the output of NAND gate 21 (and any other NAND gate, not shown, to which 0–0.99 switches may be coupled) is wired to lead 30.

The outputs from the 99.9% switches, via lead 28, go directly to the electronic counter 27, while those from the 0–0.99% switches (via lead 30) go through a division of ten in divider 31 and are then wire-ORed at 29 to the outputs from the 0–9.99% switches (NAND gate 20). The pulses on lead 29 go through a divide-by-ten circuit 32 and are wire-ORed at 28 to the input of the electronic counter 27 (point J). Thus, in the case of the 10% switches (0–9.99), the output of these switches is divided by ten; in the case of the 1% switches (0–0.990), the output of these switches is divided by 100.

As previously stated, the point J is at the input of the electronic counter 27. Waveform J, FIG. 2, represents a typical pattern of pulses which might be applied to counter 27 during one complete clock pulse (i.e., during one complete cycle of the waveform B). As illustrated in waveform J, three pulses might be applied to counter 27 during this clock pulse.

The electronic counter 27 operates in such a manner that the operator does not see it counting, but sees only the total count. For this purpose, the counter output is connected to a display 34 which is strobed at 35 by the output of a one-shot multivibrator 36 which is triggered by pulses appearing on the connection 33; scaled-down clock pulses (i.e., clock pulses which are divided or scaled by a factor of 1,000) are applied to connection 33.

The total counts from the totalizer which occur during 1,000 clock pulses are sent to the counter (which counts them) by way of input lead 28. A narrow pulse (output of one-shot 36) strobes (at 35) the display 34 to update it when a CP/1000 pulse occurs on connection 33. Display 34 displays the total in four digits including one decimal place (i.e., it will display the total percentage, to the nearest tenth percent).

The pulse output of one-shot 36 triggers a second one-shot multivibrator 37, producing a narrow pulse at the output of the latter which is applied to the reset connection 38 of counter 27. Thus, after the updating of the display 34 (when a CP/1,000 pulse occurs), the counter 27 is reset (by the output of one-shot 37) and is ready to start counting again.

When the high frequency signals (waveforms F and G) have caused the NAND decoder 9 to advance to its last or 15th, position, a signal is sent over the reset lead H (see waveform H, FIG. 2) to reset the flip-flop 6 (see waveform E) and turn off the NAND gate 7, thus preventing any additional pulses from the square wave generator 1 going into the BCD counter 3 (see waveform F; see also waveform G).

When the next clock pulse is received (as in waveform B), the BCD counter 3 is set to zero (by the reset pulse, waveform C) immediately prior to the high frequency signal being introduced to it (waveform F), and the cycle starts over again.

Using the pulse summing circuit described should eliminate mis-setting of the percent switches, or any error due to a faulty pulse generator or faulty percent switch.

An addition to the system previously described would be an alarm circuit to indicate that the operator had set a series of percentages which totaled outside of a given range. The permissible range for the total of the percent switches, for example 95 to 100%, would be set into the alarm circuit, as one input to the two-input alarm circuit; the other input to this latter circuit would be the decoded information sent at 28 to the display portion of the electronic counter 27. If this decoded information was outside the preset limits (i.e., less than 95% or more than 100%), an alarm signal would be generated which could be either transformed into a visual and/or audible alarm, and at the option of the designer could also prevent the blender or other equipment with which this was being used from operating.

The invention claimed is:

1. A circuit arrangement for totalizing the pulses selected by a plurality of selecting devices from the output of a common pulse generator in which each selecting device controls the percentage of a particular component being blended with other components in an automatic blending system and comprising a common pulse generator, a plurality of selecting devices coupled to said common pulse generator for controlling the percentages of particular components being blended, each of which selects and passes a percentage of the pulses generated by said common pulse generator, a plurality of gates equal in number to the number of selecting devices, means connecting the selecting device outputs separately and individually to said gates, means for producing a train of gating pulses having a high repetition rate as compared to the pulse repetition rate of said generator, means for applying said gating pulses sequentially to individual ones of said gates, thereby to sequentially open the same, and a common output circuit coupled to said gates.

2. Arrangement according to claim 1, including also counter means connected to said common output circuit.

3. Arrangement of claim 1, wherein each of said gates is a NAND gate to one input of which the output of a corresponding selecting device is connected and to the other input of which a gating pulse is applied.

4. Arrangement of claim 1, wherein said applying means comprises a decoder supplied with said gating pulses, and means connecting the individual gates to respective output terminals of said decoder.

5. Arrangement set forth in claim 4, wherein said decoder operates, upon the completion of each sequence of application of gating pulses to the gates, to cut off the supply of gating pulses to such decoder.

6. Arrangement described in claim 4, including also counter means connected to said common output circuit.

7. Arrangement set forth in claim 4, wherein each of said gates is a NAND gate to one input of which the output of a corresponding selecting device is connected and the other input of which is connected to a corresponding output terminal of the decoder.

8. A circuit arrangement for totalizing the pulses selected by a plurality of selecting devices from the output of a common pulse generator in which each selecting device controls the percentage of a particular component being blended with other components in an automatic blending system and comprising a common pulse generator, a plurality of selecting devices coupled to said common pulse generator for controlling the percentages of particular components being blended, each of which selects and passes a percentage of the pulses generated by said common pulse generator, a plurality of gates equal in number to the number of selecting devices, means connecting the selecting device outputs separately and individually to said gates, a source of square waves having a frequency high as compared to the frequency of said generator, a BCD counter, a decoder driven by the output of said counter, means for feeding square waves from said source to said counter, means for developing strobing pulses from said square waves, means for utilizing the last-mentioned pulses to strobe said decoder, means connecting the individual gates to respective output terminals of said decoder, and a common output circuit coupled to said gates.

9. Arrangement according to claim 8, including also counter means connected to said common output circuit.

10. Arrangement of claim 8, wherein each of said gates is a NAND gate to one input of which the output of a corresponding selecting device is connected and the other input of which is connected to a respective output terminal of said decoder.

11. Arrangement set forth in claim 8, wherein each pulse developed at the final output terminal of said decoder is utilized to disable the means which feeds square waves to said counter.

12. Arrangement set forth in claim 8, wherein each pulse developed at the final output terminal of said decoder is utilized to cut off the supply of square waves to the strobing pulse developing means.

13. Arrangement set forth in claim 8, wherein each pulse developed at the final output terminal of said decoder is utilized to disable the means which feeds square waves to said counter, and to cut off the supply of square waves to the strobing pulse developing means.

14. Arrangement of claim 13, wherein each of said gates is a NAND gate to one input of which the output of a corresponding selecting device is connected and the other input of which is connected to a respective output terminal of said decoder.

15. A circuit as set forth in claim 1 wherein said common output circuit includes a counter means for counting the pulses gated by said plurality of gates during a time interval determined by the generation of a predetermined number of pulses by said common pulse generator, means for storing the output of said counter means at the end of said time interval, and means for updating said storing means after the passage of each succeeding said time interval and including means for resetting said counter means to zero at the end of each of said time interval to allow said counter means to begin a new counting cycle during a new time interval.

16. A circuit as set forth in claim 8 wherein said common output circuit includes a counter means for counting the pulses gated by said plurality of gates during a time interval determined by the generation of a predetermined number of pulses by said common pulse generator, means for storing the output of said counter means at the end of said time interval, and means for updating said storing means after the passage of each succeeding said time interval and including means for resetting said counter means to zero at the end of each said time interval to allow said counter means to begin a new counting cycle during a new time interval.

* * * * *